US005145403A

United States Patent [19]
Schaffert et al.

[11] Patent Number: 5,145,403
[45] Date of Patent: Sep. 8, 1992

[54] SAFETY COVER FOR METER SOCKET

[75] Inventors: Gary C. Schaffert, North Canton; Thomas J. Archer, Canton; Timothy M. Chilton, Seven Hills; John T. Shincovich, North Canton, all of Ohio

[73] Assignee: Meter Devices Company, Inc., Canton, Ohio

[21] Appl. No.: 721,413

[22] Filed: Jun. 26, 1991

[51] Int. Cl.⁵ .................. H01R 31/08; H01R 13/44
[52] U.S. Cl. ........................ 439/508; 200/51.09; 439/146; 439/188
[58] Field of Search ............... 439/146, 188, 508, 517, 439/910, 912; 200/51.09–51.11

[56] References Cited

U.S. PATENT DOCUMENTS

| | | | |
|---|---|---|---|
| Re. 21,148 | 7/1939 | Myluis | 439/508 |
| 3,107,134 | 10/1963 | Kerrigan | 339/96 |
| 3,920,939 | 11/1975 | Ciboldi et al. | 200/50 |
| 4,323,294 | 4/1982 | Robinson | 339/19 |
| 4,443,676 | 4/1984 | Castonguay | 200/304 |
| 4,565,908 | 1/1986 | Bould | 200/50 |
| 4,795,354 | 1/1989 | Owen | 439/137 |
| 5,006,076 | 4/1991 | Robinson et al. | 439/146 |

Primary Examiner—Paula A. Bradley
Attorney, Agent, or Firm—Michael Sand Co.

[57] ABSTRACT

This invention relates to a safety cover assembly for a meter socket having a plurality of electrically-energizable contacts adapted to receive the rearwardly-projecting contact blades or terminals of various types of electrical meters including those used for measuring both commerical and residential power consumption. The socket normally has a substantial number of electrical contact elements in suitable spaced-apart alignment to receive the projecting contact terminals of various types of meters to energize one or more electrical circuits within the meter to determine both the accuracy and efficiency of the meter. The cover assembly is preferably formed of transparent plastic insulating material having high dielectric constant including an outer apertured cover plate to provide an essentially dead front to the meter socket when energized, both when a meter is mounted in and demounted from the meter socket. The components of the meter cover assembly are preferably comprised of durable transparent insulating material for visual inspection of the wiring, internal electrical contacts and connections, the socket being designed for both laboratory and field applications.

13 Claims, 3 Drawing Sheets

SAFETY COVER FOR METER SOCKET

BACKGROUND OF THE INVENTION

In various types of electrical power distribution systems, meters for measuring electrical power consumption, both commercial and residential, are usually provided with rearwardly-projecting contact blades or terminals for insertion into and frictional engagement with a meter socket having spring jaw connectors. Periodic testing of such meters is required to determine their accuracy in measuring power consumption, usually by mounting the meter in a meter socket. The meter, when mounted in the socket, is usually held in place by a meter ring which clamps a meter flange to a support member associated with the meter socket, or by a cover plate having a peripheral aperture for receiving the meter housing, the periphery of which aperture covers the meter flange.

The meters are usually tested in a meter test board or warmup board as they are usually referred to in the industry. These boards contain a considerable number of sockets for receiving and holding a number of meters. The meters contain batteries and remain energized on the board to save the batteries until the meters are needed for an actual field installation. Therefore due to the number of such sockets in each board, it is preferred that the sockets without meters be secured from accidental contact by the test meter personnel.

In certain types of procedures where it is necessary to provide temporary electrical power to the meter socket without a meter mounted in place, or where it is desirable to bypass the meter socket, it is occasionally necessary to provide a jumper member for connecting the live terminals of the meter socket to the load terminals of the meter. Although such procedures may be accomplished with jumper cables or connectors, such procedure leaves the contacts exposed to the weather and also capable of accidental or unintentional contact by testing personnel or other personnel unaware of the exposed electrical potential.

TECHNICAL FIELD

The subject invention relates to a safety cover assembly for a meter socket having a plurality of electrical connectors which are normally exposed for interconnection with the rearwardly-projecting terminals of the meter. The subject cover assembly is particularly useful both when the socket has a meter mounted in place for testing, as well as when the meter is removed and the socket connectors are electrically energized. The cover is preferably comprised of insulating plastic material which is transparent in nature to be interposed between both the electrical connectors of the socket and the terminals of the meter to provide a safeguard for the socket at all times whether the meter is mounted or demounted.

BACKGROUND INFORMATION

Various types of jumpers have been employed previously to safeguard the meter socket from accidental or unintentional contacting or grounding by testing personnel which poses a serious threat of electrical shock or injury to both testing and unauthorized personnel. One type of such socket jumper has been disclosed in U.S. Pat. No. 4,323,294 to Robinson having a plastic disc with a diameter and edge thickness substantially the same dimensions as a meter of the type designed for assembly within such socket. A disc is provided with a series of integrally-mounted pockets which protrude from the front of the disc and intersect stiffening ribs molded into the face of the cover to strengthen the pocket walls against expansive force of rear-type fasteners inserted into the rearward side of the jumper. The plurality of pockets is provided at predetermined positions on the disc to allow assembly of jumpers at different positions to allow the device to be used with meter sockets of various types. Such jumpers have previously been used for attachment to meter sockets of various standardized types, but do not normally comprise a permanent part thereof to safeguard the sockets against accidental contact and possible injury.

SUMMARY OF THE INVENTION

The subject invention relates to a safety cover assembly for a meter socket having a plurality of electrically-energizable contacts adapted to receive the rearwardly-projecting contact blades of various types of electrical meters including those used for measuring commercial, industrial and residential power consumption. The socket normally has a substantial number of electrical contact elements in suitable alignment to receive the projecting contact blades of various types of meters to energize one or more electrical circuits to determine both the accuracy and efficiency of the meter. Meters capable of handling main power line voltages such as 120/240 volts, 277/480 volts, 480 delta, 120/208 Y as well as meters which are designed having both single phase and three phase circuit connections. The cover assembly is useful for combination with a wide variety of meter sockets, especially those designated as multi-purpose for testing a number of different types of meters.

The assembly includes an outer plate having a plurality of spaced-apart apertures therein for passage of the meter contact blades therethrough. The assembly also includes an inner plate of the socket supporting a plurality of electrical contact elements fixedly mounted between said inner and outer plates in alignment with the apertures of the outer plate. The plates are joined in spaced-apart relation by transverse rigid interconnecting members such as plastic bolts, all of which are formed of plastic insulating material having high dielectric constant. The meter contact blades are adapted to make positive electrical contact with the socket contact elements, both those mounted within the cover assembly, as well as those mounted separately from the cover assembly on the socket base for completing electrical circuits of the meter for electrical testing. The meter socket normally includes clamping elements for positively retaining a plurality of rearwardly-projecting contact blades or terminals of the meter to fixedly retain the meter in place on the socket for conducting various test procedures. The majority of the socket contact elements include a plurality of spring-jaw type terminals into which the meter contact blades are frictionally engaged for testing by making positive electrical connections.

Accordingly, it is an object of the present invention to provide an improved meter socket having a safety cover to prevent exposure of live electrical contacts. In the laboratory, the meter socket normally utilizes a locking jaw arrangement for safety purposes while in field applications usually only spring jaws and a locking ring are employed to positively retain the meter in the socket. The cover assembly is normally comprised of non-tracking high dielectric constant plastic material such as transparent polycarbonate having sufficient thickness to maintain structural strength to assist in supporting the meter in place. The outer aperture plate of the meter socket cover presents an electrical barrier to provide an essentially totally dead front to the meter socket to prevent unintentional electrical contact between the energized contact elements and testing or other personnel.

A further object of the present invention is to provide a cover assembly for a multi-purpose meter socket which is capable of testing various types of electrical meters in a single socket. Such sockets have a great number of electrical contacts for receiving different configurations of meter terminals so that one socket can be used to test a wide variety of meters. The great number of socket contacts aligned in adjacent spaced relation create a situation where live contacts can present an electrical hazard.

The middle jaws of the meter socket constitute a so-called bridge assembly adapted to receive both thin blade and transverse bar-type projecting terminal contacts on the rearward side of the meter. The multi-purpose socket is normally designed to accept essentially all known types of ANSI (American National Standard Institute) meter forms. The apertured outer plate and inner plate of the cover assembly are joined by suitable interconnecting insulating bolts so that the cover assembly is fully insulated. The inner plate is connected to an insulating base by a pair of transverse insulating plates. Electrical-grade polycarbonate sold under the trade name "Lexan" made by General Electric Company is a preferred material for the components of the cover assembly including the bolts, although other types of durable plastic materials having high dielectric constant may also be employed.

Another objective of the invention is to provide such a safety cover which is in compliance with ANSI Standards C12.7 and C12.10.

BRIEF DESCRIPTION OF THE DRAWINGS

The preferred embodiment of the invention, illustrative of the best mode in which applicant has contemplated applying the principles, are set forth in the following description and are shown in the drawings, and are particularly and distinctly pointed out and set forth in the appended claims.

Similar numerals refer to similar parts and elements throughout the drawings.

DESCRIPTION OF THE PREFERRED EMBODIMENT

Figure 1:
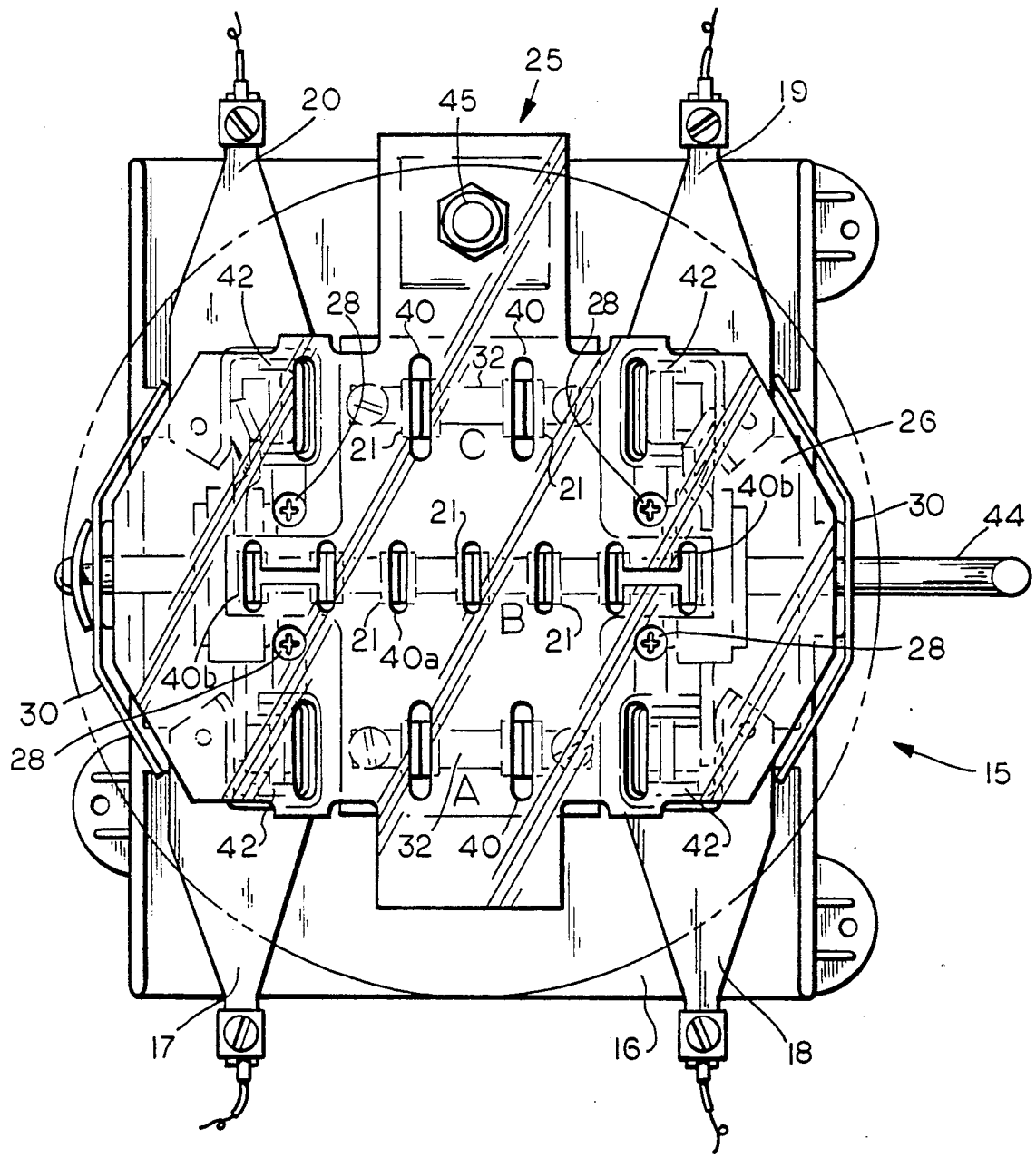
FIG. 1 is a top plan view of a representative multi-purpose meter socket having the subject safety cover assembly mounted in place on the socket base with a meter removed.

Referring to the drawings, and more particularly to FIG. 1, a meter socket designated by the numeral 15 is provided to receive an electrical meter for testing and other procedures. The meter is removed from the socket 15 in FIG. 1 and shown in mounted relation within the socket 15 in FIG. 2, the meter being designated by the letter M.

Figure 2:
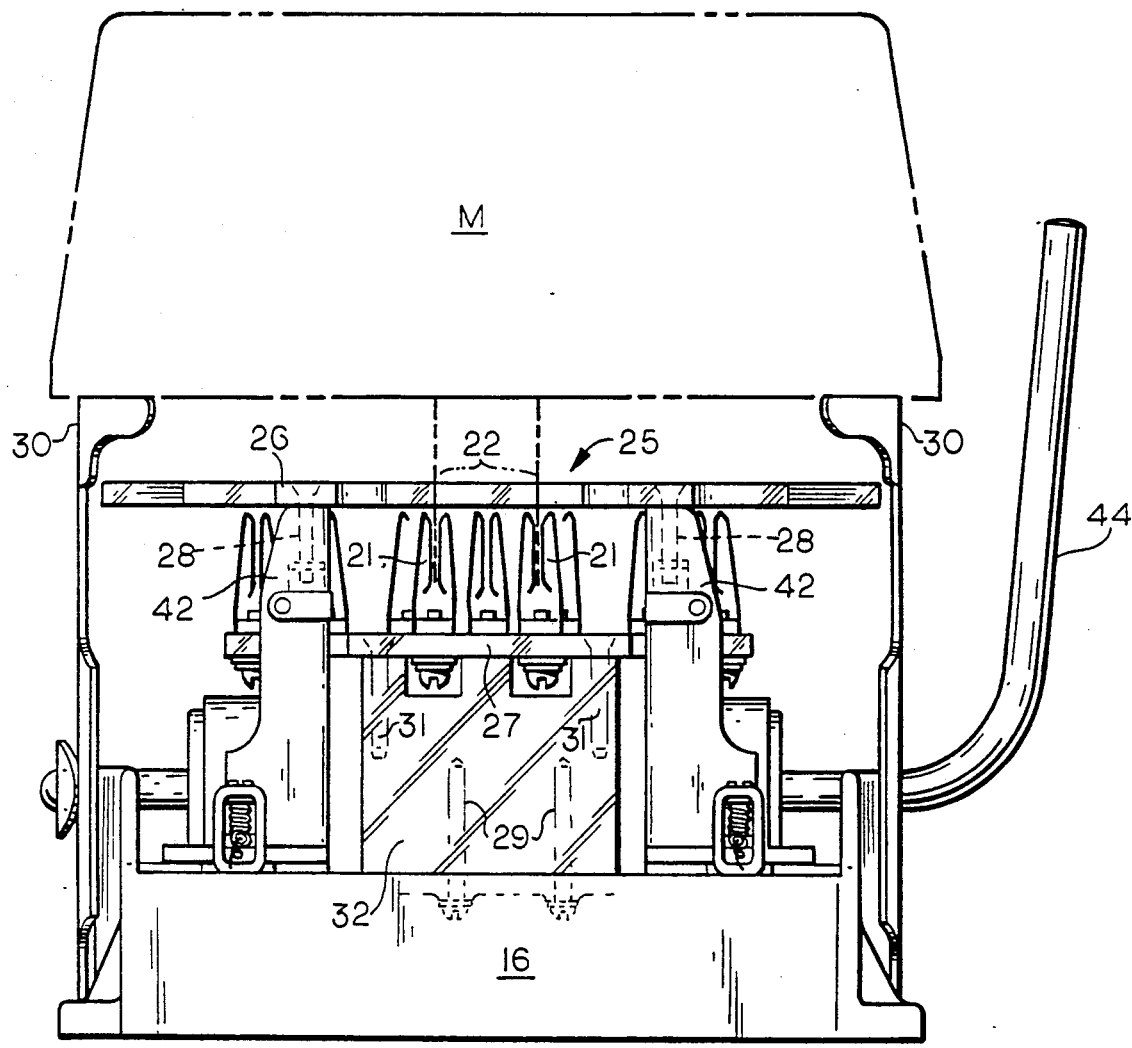
FIG. 2 is a side elevational view of the meter socket of FIG. 1 having an electrical meter mounted in place on said socket for testing.

The meter socket 15 is comprised of a base member 16 which is generally rectangular in shape and preferably formed of rigid insulating plastic material. A plurality of electrical wires, normally in the form of a multi-wire harness, lead from varied power sources (not shown) to the four harness assemblies located generally at the four corners of the base member 16, the wiring harnesses being designated by the numerals 17, 18, 19 and 20. The wiring of each harness leads to and is connected to the individual contact elements 21 of the socket for electrically-energizing a prescribed number and arrangement of such contact elements depending upon the meter type to be tested. The contact elements 21 are shown in three parallel rows designated by the letters A,B and C in FIG. 1 which provide a prescribed pattern of socket elements which are aligned to receive a complement pattern of meter terminal or blades designated by the number 22 for a given meter type as shown in FIG. 2. The prescribed contact elements and their electrical leads are determined by the ANSI standards for a given meter. Suffice to say, the required number of socket contact elements 21 and their locations are designed to receive the terminals 22 of an individual meter for its testing. Such wiring connections for a multi-purpose socket are well known in the art and do not comprise a unique feature of the present invention.

Figure 3:
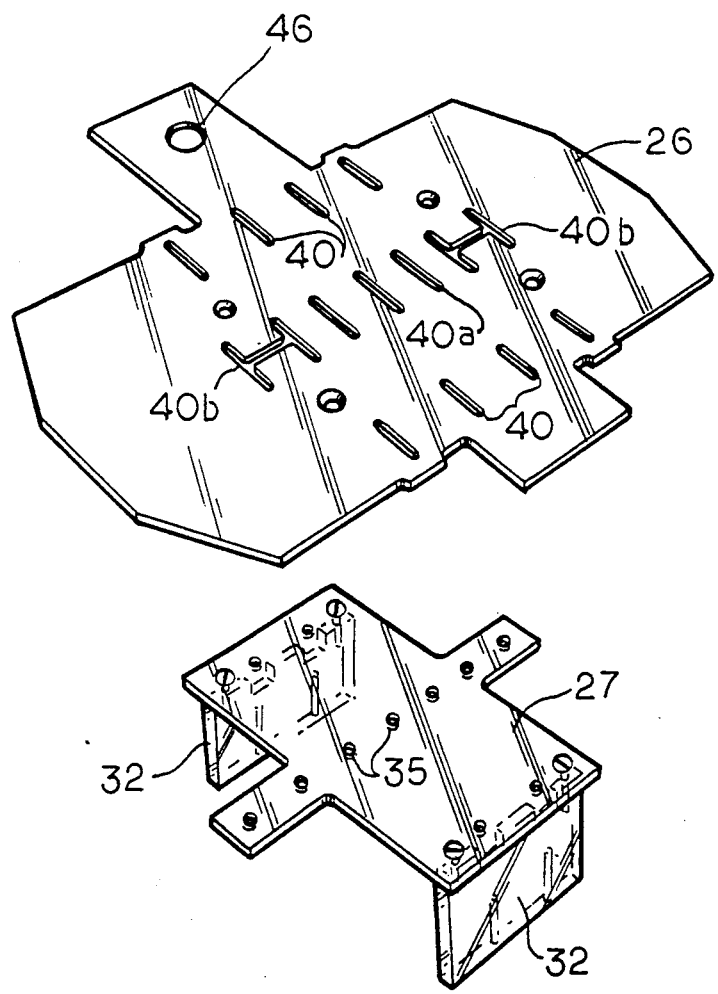
FIG. 3 is an exploded view of the components of the safety cover assembly separated from the meter socket shown in both FIGS. 1 and 2.

The socket 15 includes on its facing exterior a socket cover assembly 25 having an apertured outer plate 26 into which the rearwardly-projecting contact blades 22 (FIG. 2) of the meter M are passed to make electrical contact with the contact elements 21 of the meter socket. The apertured outer plate 26 is combined with an inner plate 27, the two plates being joined in parallel by a plurality of transversely-disposed insulating bolts or self-tapping screws 28. Outer plate 26 and inner plate 27 are fixedly joined by self-tapping plastic screws 28—as shown in FIGS. 1 and 2. As shown in FIGS. 1 and 3, the outer plate 26 of the socket assembly has three rows of apertures (A, B and C) which are in alignment with the three rows of contact elements 21 of the socket, the rows being similarly aligned in parallel spaced-apart adjacent relation. The outer plate 26 is generally circular in shape with cut-off straight sides forming generally an octagon, for example, and having a diameter either similar to or closely complemental to the diameter of the meters to be tested. The apertures or openings 40 in outer plate 26 have dimensions slightly greater than the meter terminals for their passage therethrough without contacting the outer plate. The thickness of outer plate 26 ranging from about ¼ to ⅜ inch prevents physical contact with live socket elements of the socket.

In one preferred form of meter socket upstanding similar flanges 30 having inwardly angled sides are provided on opposite sides of the socket for engaging and supporting the perimeter of the meter at its rearward side for its positive retention. The inner plate 27 is joined to the socket base 16 by a pair of spaced-apart transverse parallel plates 32 which are interconnected to the inner plate 27 by self-tapping insulating bolts 31 and to base 16 by screws 29. The heads of insulating bolts 28 joining the two plates 26 and 27 are shown as having Philips heads in FIG. 1 and the insulating bolts 29 joining inner plate 27 to the hollow base 16 by parallel plates 32 are shown in dotted outline in FIG. 2.

The inner and outer plates 26 and 27 and interconnecting bolts or screws 28 and 29 of the cover assembly 25 are formed of durable plastic material having a high dielectric constant making the cover assembly fully insulated.

A preferred plastic material for forming the safety cover assembly 25 is transparent polycarbonate material, designated as non-arcing electrical grade material sold by the General Electric Company under the trade name "Lexan". Material consisting of flat plates having a thickness of about ⅛ to ⅜ inch is desirable for forming the plates 26, 27 and flanges 30 for providing sufficient strength to the cover as well as a nonconducting dielectric to prevent arcing between terminals.

The inner plate 27 has a plurality of small apertures 35 (FIG. 3) therein in spaced lineal relation through which the spring-type jaw clips of contact elements 21 are mounted in fixed relation in alignment with the apertures 40 in the outer plate 26. The central portion of the outer and inner plates 26 and 27 is called the "bridge assembly" having both elongated oval-shaped apertures 40a disposed outwardly in plate 26 and in alignment with the spring-type jaw clips of contact elements 21 as well as slot or H-type apertures 40b at opposite extremities of the bridge assembly. The apertures are adapted to receive both blade-type and transverse bar-type projecting terminals 22 on the rearward side of the meter. The cover assembly is thus comprised of the plastic parts, preferably transparent polycarbonate material joined by insulation bolts or screws 28 also preferably formed of similar plastic material.

As shown in the drawings, the cover assembly 25 generally consists of two spaced-apart parallel plates to contain a series of electrical contact elements 21 therewithin in alignment with the apertures in outer plate 26. The facing plate prevents inadvertent or accidental contact with live socket contact elements 21 when energized by operating or other personnel, the live contacts being at all times recessed within the socket by the outer cover plate. Thus, the cover assembly is fully insulated to provide long life to the meter socket with high voltage electrical current passing closely adjacent to its outer and apertured surfaces. The plastic material preferably is of a non-arcing electrical grade type to provide desirable insulating properties to the cover assembly, and especially the open-faced exterior surface of the meter socket.

The meter socket also includes one or more outer jaws 42 which serve to positively lock the meter in fixed position within the socket during testing. The rearward surface of the meter is normally spaced from the planar apertured outer plate 26 of the cover assembly with only the contact blades or terminals 22 extending downwardly into the meter socket for electrical connection.

The locking jaws 42 are shown in FIGS. 1 and 2 located at the four corners of the cover assembly which are operated into and out of locking arrangement with the meter terminals by a cam-operated lever arm 44. The right-angled lever arm 44 extends through a central region of a lower portion of the socket having spaced-apart cams thereon which are employed to move the locking jaws on both sides thereof into locking and unlocking relation. The upstanding outer portion of right-angled lever arm 44 is moved rotatably to effect the locking and unlocking. The locking jaws are capable of frictionally engaging blade-type terminals of the meter when placed in testing relation with the socket. The arm is rotated through a relatively small angle to lock and unlock the locking jaws, the locking in place being maintained during testing.

The cover assembly is shown disassembled in FIG. 3, the bottom or inner plate 27 and the outer plate 26 being joined by interconnecting transverse screws 28. After the jaw-type clips of contact elements 21 are mounted on the inner plate 27, such as by bolting or screwing thereto, the separate outer plate 26 is connected to the lower inner plate 27 by screws 28 for mounting in the meter socket. The contact jaws are thereby positively mounted between the plates. The electrical lead wires from the various wiring harnesses are connected to the contact elements 21 of the socket before the cover assembly is fully assembled on the socket.

A pressure-operated switch 45 which is optional is preferably mounted in an aperture 46 on a laterally projecting portion of the outer plate 26. The switch, when depressed by mounting the meter on the meter socket, energizes the contact elements 21 within the meter socket for conducting test procedures. At such time, the meter terminals 22 are fully engaged within the contact elements 21. When the meter is demounted, the switch 45, is again operated to de-energize the contact elements 21. Thus, insertion of the meter automatically energizes the switch 45 and the meter socket at the contact terminals for the particular type of meter being tested.

Two levels of safety are provided to the meter socket by use of the subject cover assembly. The apertures in the top or outer plate 26 protect against outward exposure of live terminals when the socket is energized, and preferably the one or more clamping jaws 42 on the outer periphery of the inner plate 27 serve to interlock the meter fixedly in place in the socket to prevent faulty or erratic readings during testing of the meter.

Various types of meters such as those designed to measure electrical power consumption delivered to individual and commercial consumers may be tested using the prescribed socket in both laboratory and field applications. Meters for handling main alternating current voltages such as 120/240 volts, 277/480 volts, 480 delta, 120/208 volts, including those used with both single phase and three phase electrical circuits may be tested using the subject multi-purpose socket. The cover eliminates the use of jumpers or other connectors to ensure proper electrical connection of terminals to the testing socket and related electrical equipment.

The cover assembly is preferably comprised of clear transparent plastic material providing greater reliability wherein the test personnel are able to view the interior of the socket assembly and its various electrical contacts and connections to ascertain if any damage has occurred to the meter socket in the field or laboratory before recordation of readings on the meter under test. The jaws in the jaw-type clips of contact elements 21 in the center portion of the meter socket always have specific numbers assigned to each jaw-type clip in accordance with ANSI standards.

Essentially, significant levels of safety are provided to the meter socket by the insulated cover assembly. The safety interlock insulates the meter from ground and if an electrical fault should occur, it protects testing personnel as well as others from electrical shock. As stated, the base portion 16 of the meter socket is also comprised of insulating durable plastic material to provide additional insulation for the meter socket and provides protection against electrical faults which may occur within the meter or meter socket during testing.

The energized electrical jaws of contact elements 21 are normally connected in pairs which contact enables both vertical blades and horizontal bars of some meters to be connected for proper testing and evaluation for further use, or for their re-manufacture or replacement if faults are detected. Some types of meters have four electrical terminals while some meters have two separate transverse bar-type elements and two separate parallel blade-type elements which comprise their electrical contacts for energizing the meter. Although in the preferred illustrated embodiment, the cover assembly is formed of transparent plastic, it may also be formed of opaque insulating plastic material to provide the desired safety characteristics without internal visibility.

Accordingly, the subject safety cover assembly for a meter socket is simplified providing a effective, safe, inexpensive and efficient insulating cover for a multipurpose meter socket which achieves all of the enumerated objectives and solves problems and obtains new results in the art.

In the foregoing description, certain terms have been used for brevity, clearness and understanding; but no unnecessary limitations are to be implied therefrom beyond the requirements of the prior art, because such terms are used for descriptive purpose and are intended to be broadly construed.

Having now described the features, discoveries and principles of the invention, the manner in which the safety cover assembly is constructed and used in several forms, the characteristics of the construction, and the advantageous new and useful results obtained; the new and useful structures, devices, elements, arrangements, parts and combinations, are set forth in the appended claims.

We claim:

1. A safety cover assembly for a meter socket to prevent outward exposure of electrically-energized contacts of said socket aligned to receive a plurality of rearwardly-projecting contact terminals of an electrical meter for electrical testing and the like, said safety cover assembly comprising a base member, an outer plate having a plurality of spaced-apart apertures therein for passage of said meter contact terminals therethrough, an inner plate having a plurality of electrical contact elements fixedly mounted thereon between said inner and outer plates in alignment with the apertures of said outer plate, said plates and said base member being joined in spaced-apart relation by transverse rigid interconnecting members, said plates and interconnecting members being formed of plastic insulating material, said meter contact terminals adapted to electrically contact said contact elements mounted within said cover assembly to complete one or more electrical circuits between said meter and said meter socket.

2. A safety cover assembly for a meter socket in accordance with claim wherein said plurality of electrical contact elements comprise spring-jaw type terminals mounted immediately beneath said outer insulating plate in alignment with said spaced-apart apertures therein.

3. A safety cover assembly for a meter socket in accordance with claim 1, including a pressure-operated electrical safety switch mounted on the periphery of said outer plate adapted to energize and de-energize said meter contact elements when said meter is mounted on and demounted from said meter socket.

4. A safety cover assembly for a meter socket in accordance with claim 1, wherein said outer plate, said inner plate and said transverse interconnecting members are all comprised of transparent polycarbonate plastic material.

5. A safety cover assembly for a meter socket in accordance with claim 1, wherein the majority of said meter socket contact elements is mounted in co-planar relation immediately adjacent and in alignment with the plurality of apertures in said outer plate.

6. A safety cover assembly for a meter socket in accordance with claim 1, wherein the majority of said spaced-apart apertures in said outer plate are elongated oval-shaped in configuration and the minority are H-shaped in configuration, said apertures adapted to receive the said contact terminals of various types of electrical meters in electrical contact with complementally-spaced socket contact elements.

7. A safety cover assembly for a meter socket in accordance with claim wherein said plurality of electrical contact elements of said meter socket is mounted in spaced-apart relation adapted to receive complementally-spaced contact terminals of different types of electrical meters for electrical testing.

8. A safety cover assembly for a meter socket in accordance with claim 1, wherein said cover assembly is comprised of transparent insulating plastic material having a high dielectric constant, said outer and inner plates having a thickness of ranging from about $\frac{1}{8}$ to $\frac{3}{8}$ inch.

9. A safety cover assembly for a meter socket in accordance with claim 1, wherein said meter socket has a plurality of spaced-apart clamping elements adapted to receive a plurality of contact terminals of said electrical meter to retain the said meter fixedly in place within said meter socket for electrical testing.

10. A safety cover assembly for a meter socket in accordance with claim 1, wherein the said outer plate of said meter socket has both elongated oval-shaped and transverse H-shaped apertures in alignment in a central bridge region to receive both parallel blade-type and transverse bar-shaped contact elements of an individual meter.

11. A safety cover assembly for a meter socket in accordance with claim 1, wherein said meter socket has varied electrical potential at its socket contacts adapted to test varied types of electrical meters.

12. A safety cover assembly for a meter socket in accordance with claim 1, wherein the said base member is comprised of rigid plastic insulating material.

13. A safety cover assembly for a meter socket in accordance with claim 12, wherein the majority of said electrical contact elements are mounted in spaced-apart relation on said inner insulating plate and the minority of said socket contacts are mounted on said baser member of said meter socket.

* * * * *